(12) United States Patent
Hata

(10) Patent No.: US 9,025,179 B2
(45) Date of Patent: May 5, 2015

(54) PRINTING APPARATUS, PRINTING METHOD, AND STORAGE MEDIUM STORING PROGRAM

(75) Inventor: Kenshi Hata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 12/968,142

(22) Filed: Dec. 14, 2010

(65) Prior Publication Data

US 2011/0164276 A1 Jul. 7, 2011

(30) Foreign Application Priority Data

Jan. 7, 2010 (JP) .................... 2010-002374

(51) Int. Cl.
*G06F 3/12* (2006.01)
*G06K 15/00* (2006.01)

(52) U.S. Cl.
CPC ............ *G06F 3/1204* (2013.01); *G06F 3/1258* (2013.01)

(58) Field of Classification Search
CPC .... G06F 3/1258; G06F 3/1219; G06F 3/1252
See application file for complete search history.

(56) References Cited

U.S. PATENT DOCUMENTS

| | | | |
|---|---|---|---|
| 7,630,095 B2 | 12/2009 | Tarumi | |
| 2003/0067618 A1* | 4/2003 | Farrell et al. | 358/1.12 |

FOREIGN PATENT DOCUMENTS

| | | |
|---|---|---|
| JP | 10-049326 A | 2/1998 |
| JP | 2003-266901 A | 9/2003 |
| JP | 2006-289735 A | 10/2006 |
| JP | 2008-027216 A | 2/2008 |

* cited by examiner

*Primary Examiner* — Dov Popovici
(74) *Attorney, Agent, or Firm* — Fitzpatrick, Cella, Harper & Scinto

(57) ABSTRACT

A print job to undergo print processing is selected from a list of held print jobs. A printing medium type set in the selected print job is selected from a list of feedable printing medium types. At this time, the printing medium type set in the selected print job is displayed preferentially to other printing medium types.

20 Claims, 7 Drawing Sheets

F I G. 4

| INPUT ORDER | JOB NAME | PAPER TYPE | OWNER | STATUS | INPUT TIME |
|---|---|---|---|---|---|
| 1 | Job1 | PREMIUM MAT PAPER | PC110 | HELD | 10:00 |
| 2 | Job2 | PLAIN PAPER | PC110 | HELD | 13:00 |
| 3 | Job3 | PHOTO GLOSSY PAPER (THICK) | PC110 | HELD | 14:00 |
| 4 | Job4 | THICK COATED PAPER | PC120 | HELD | 17:00 |

PRINTING APPARATUS, PRINTING METHOD, AND STORAGE MEDIUM STORING PROGRAM

BACKGROUND OF THE INVENTION

1. Field of the Invention

The present invention relates to a printing apparatus, a printing method, and a storage medium storing a program, capable of feeding a plurality of types of printing media.

2. Description of the Related Art

Conventionally, a printer compares a paper type designated by a print job with one actually set in the printer, and when they are different, for example, warns the user. Japanese Patent Laid-Open No. 10-49326 discloses a method of, when paper types set by a print job and printer differ from each other, saving (holding) the print job and preferentially printing a print job whose paper type matches that of the printer. Japanese Patent Laid-Open No. 2006-289735 discloses an arrangement, which displays exchange of a paper type for use that is not set in a printer.

To appropriately print even a held print job, a paper type designated by the held print job needs to match one actually set in a printer. The user makes paper types match each other by selecting one of paper types displayed on the panel of the printer main body.

However, the user needs to search for a paper type for use from the screen presenting many paper types, and this operation is cumbersome.

SUMMARY OF THE INVENTION

An aspect of the present invention is to eliminate the above-mentioned problems with the conventional technology. The present invention provides a printing apparatus, a printing method, and a storage medium storing a program to improve operability when selecting a printing medium set in a print job.

The present invention in its first aspect provides a printing apparatus capable of feeding a plurality of types of printing media, the apparatus comprising: a holding unit configured to hold a print job; a first display unit configured to display a list of print jobs held in the holding unit; a first selection unit configured to select a print job to undergo print processing, from the list of print jobs displayed on the first display unit; a second display unit configured to display a list of feedable printing medium types; a second selection unit configured to select a printing medium type set in the print job selected by the first selection unit from the list of printing medium types displayed on the second display unit; and a printing unit configured to perform print processing for the printing medium type selected by the second selection unit for the print job selected by the first selection unit, wherein the second display unit displays, preferentially to other printing medium types, the printing medium type set in the print job selected by the first selection unit.

The present invention in its second aspect provides a printing method executed in a printing apparatus capable of feeding a plurality of types of printing media, the method comprising: a holding step of holding a print job; a first display step of displaying a list of print jobs held in the holding step; a first selection step of selecting a print job to undergo print processing, from the list of print jobs displayed in the first display step; a second display step of displaying a list of feedable printing medium types to display, preferentially to other printing medium types, the printing medium type set in the print job selected in the first selection step; a second selection step of selecting a printing medium type set in the print job selected in the first selection step from the list of printing medium types displayed in the second display step; and a printing step of performing print processing for the printing medium type selected in the second selection step for the print job selected in the first selection step.

The present invention in its third aspect provides a computer-readable storage medium storing a program for causing a computer to hold a print job, display a list of held print jobs, select a print job to undergo print processing, from the displayed list of print jobs, display a list of feedable printing medium types to display, preferentially to other printing medium types, the printing medium type set in the selected print job, select a printing medium type set in the selected print job from the displayed list of printing medium types, and perform print processing for the printing medium type selected for the selected print job.

The present invention can improve operability when selecting a printing medium set in a print job.

Further features of the present invention will become apparent from the following description of exemplary embodiments with reference to the attached drawings.

BRIEF DESCRIPTION OF THE DRAWINGS

FIG. 4 is a table showing the state of a print queue;

DESCRIPTION OF THE EMBODIMENTS

Figure 1:
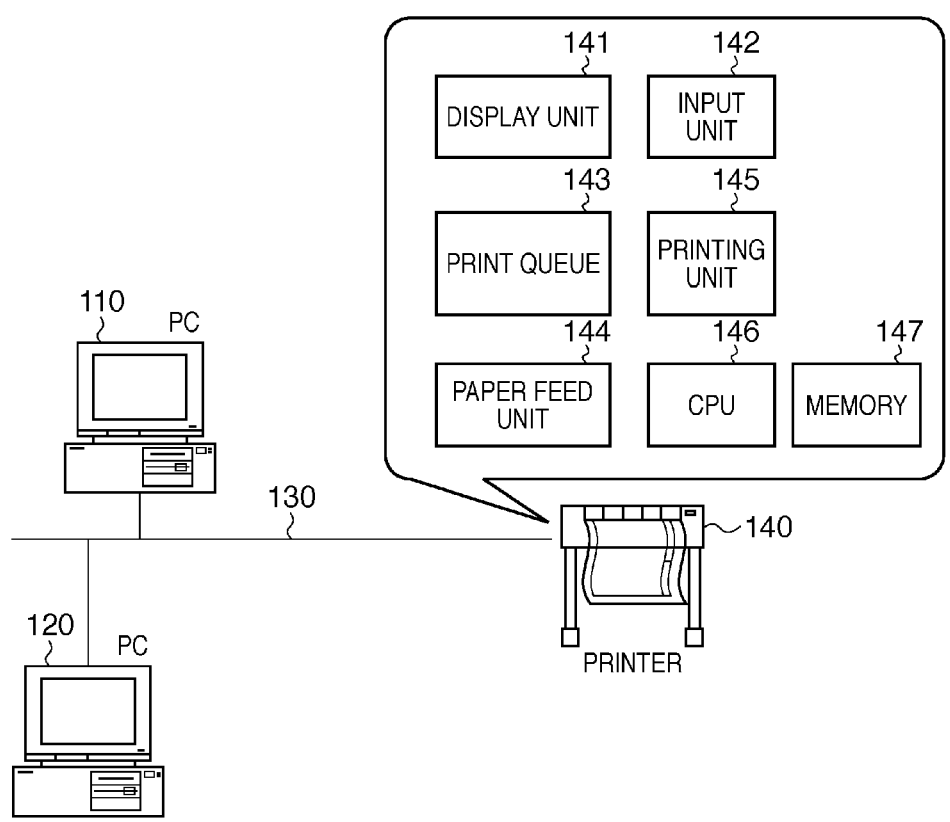
FIG. 1 is a view showing the configuration of a printing system according to an embodiment of the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same parts, and a repetitive description thereof will be omitted.

FIG. 1 is a view showing the configuration of a printing system according to an embodiment of the present invention. The printing system includes a PC 110, PC 120, network 130, and printer 140. The PCs 110 and 120 can transmit print jobs to the printer 140 via the network 130 using a printer driver or the like. The printer 140 is a large-format printer, and can feed a plurality of types of printing media (for example, sheets) for printing.

The internal arrangement of the printer 140 will be explained. A display unit 141 is a display panel for displaying the state of the printer 140 and setting a paper type. An input unit 142 includes various input keys such as up and down scroll buttons and a selection button. A print queue 143 is used to hold print jobs received from the PCs 110 and 120. A paper feed unit 144 feeds paper used for printing to the printer 140. A printing unit 145 prints a print job held in the print queue 143 (to be also referred to as a held job) using paper fed by the paper feed unit 144. A CPU 146 controls the respective units to perform print processing for a print job and image data sent to the printer 140. A memory 147 includes, for example, a ROM and RAM. The memory 147 saves image data and paper information, and stores the result of arithmetic processing, a program for implementing the embodiment, and the like.

Figure 2:
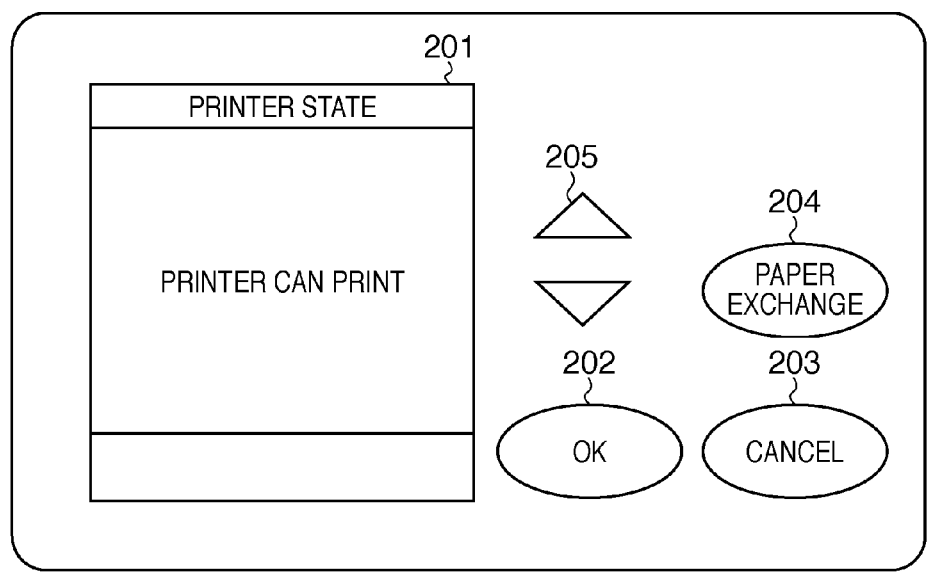
FIG. 2 is a view exemplifying a display unit and input unit.

FIG. 2 is a view exemplifying the display unit 141 and input unit 142. A panel 201 is an example of the display unit 141, and is, for example, a liquid crystal panel. As shown in FIG. 2, the panel 201 displays the state of the printer 140, various print settings, and the like. Operation keys 202 to 205 are examples of the input unit 142. The operation key 202 is used to finalize an operation. The operation key 203 is used to cancel an operation. The operation key 204 is used to exchange fed paper with new one and feed the new paper (paper exchange). The operation key 204 is used to change currently fed paper and feed different paper to the printer 140 when, for example, printing a held job. The operation key 205 includes up and down scroll keys, and is used to scroll the selection display up and down on the panel 201.

Figures 3A, 3B:
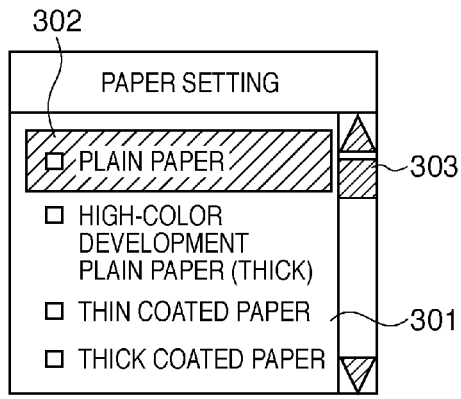
FIGS. 3A and 3B are views exemplifying a screen displayed on a panel.

FIG. 3A exemplifies a screen displayed on the panel 201 when the user presses the operation key 204 (paper exchange button). A display 301 displays some types of paper feedable to the printer 140. When the user presses the operation key 204, a number displayable on the panel 201 out of the list 304 displays paper types as a default from the top of a paper type list 304. From the list 304, the user selects the type of paper to be fed. A display 302 presents selected paper. With the operation key 205, the user scrolls up and down, and selects the type of paper to be fed. A display 303 is a scroll bar. When the panel 201 cannot display all display contents, the user scrolls to display the paper type list 304. In the embodiment, the list 304 is a list of paper types the printer 140 deals with.

To obtain an appropriate printing result, a paper type designated by a print job needs to match one actually set in the printer 140. In general, a large-format printer copes with as many as several ten paper types, as shown in FIG. 3B. However, the printer 140 can display only some of paper types in the list 304 at once owing to limitations on the number of characters displayable on the panel 201, and the like. The user needs to search for a paper type to be selected from the list 304 by using the operation key 205 in the display 301 to scroll the screen up and down. This operation is cumbersome. To solve this problem, the embodiment preferentially displays the paper type of a selected held job when exchanging paper.

FIG. 4 is a table showing the state of the print queue 143. FIG. 4 shows a state in which print jobs are input from the PC 110 or 120 in order of Job1, Job2, Job3, and Job4. For example, Job1 represents that mat paper is designated as the paper type via the printer driver or the like, Job1 has been input from the PC 110, the print job is held, and it was input at 10:00.

Figure 5:
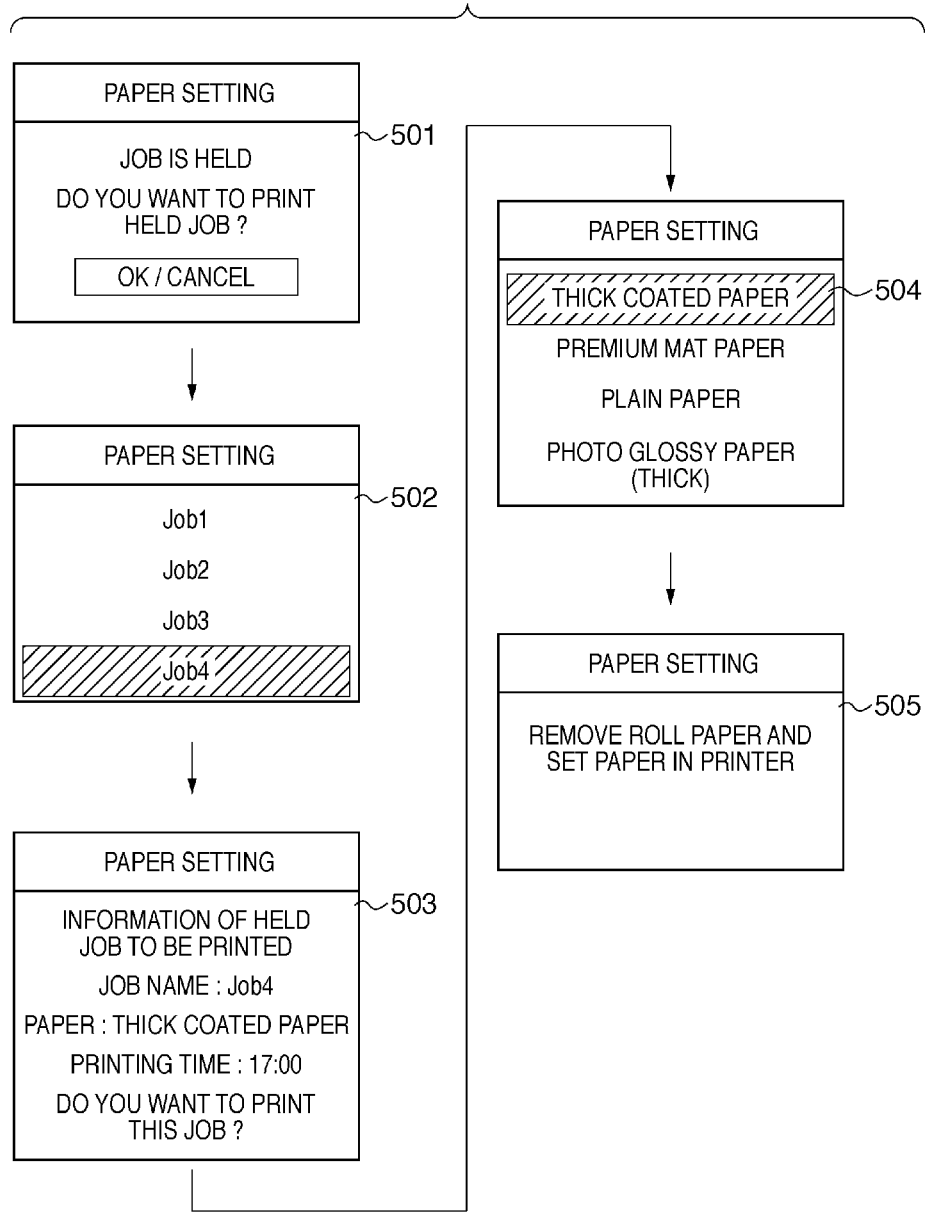
FIG. 5 is a view showing transition of a screen displayed on the panel.

FIG. 5 is a view showing transition of a screen displayed on the panel 201 in the embodiment. A screen 501 is an example for notifying the user that the print queue 143 shown in FIG. 4 has been held owing to a mismatch between a paper type designated by a print job and a set paper type. A screen 502 is displayed to select a print job held in the print queue 143 when the user presses the operation key 202 (OK button) or the operation key 204 (paper exchange button) while the screen 501 is displayed. The screen 502 may display the name, number, or the like of a held job. The user selects a held job by scrolling up and down on the screen 502 using the operation key 205. A screen 503 appears when the user selects a held job from the screen 502 and presses the operation key 202 (OK button).

The panel 201 displays a screen 504 when the user presses the operation key 202 (OK button) to finalize printing of a held job while the screen 503 is displayed. As represented by the screen 504, a paper type designated by the selected held job is displayed at the top. In the embodiment, as represented by the screen 504, the paper type may be highlighted and emphasized on the screen to present that coated paper is preset.

Other paper types may be displayed in the order in which print jobs have been held. The user may select whether to print using a paper type set in a held job or using another paper type. In the screens 501 to 504, the user may determine in each step whether to execute or cancel the print sequence of a held job before transition to the next screen. For example, in cancellation, the user may press the operation key 203 (cancel button) to cancel current settings and return to the screen 501. The panel 201 displays a screen 505 after the user selects paper of a held job in the screen 504. As represented by the screen 505, the user is notified to remove currently fed paper and set new paper.

Figure 6:
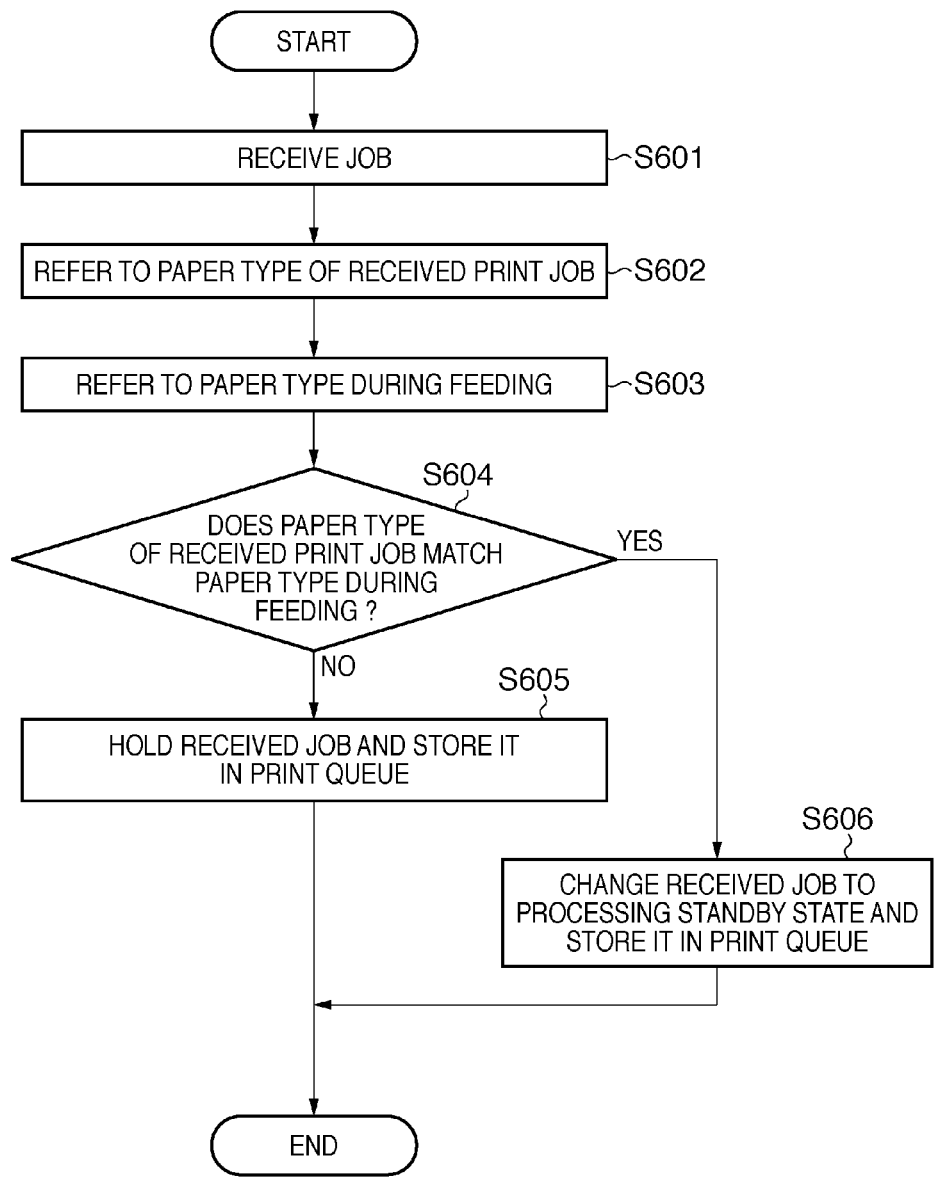
FIG. 6 is a flowchart showing the sequence of processing performed when a printer receives a print job.

FIG. 6 is a flowchart showing the sequence of processing performed when the printer 140 receives a print job from the PC 110 or 120. For example, the CPU 146 of the printer 140 executes the processing shown in FIG. 6. Assume that the printer 140 receives the print job Job4 while "semi-glossy paper" is currently fed as a paper type in the paper feed unit 144 of the printer 140. Also, assume that the printer 140 has already received the print jobs Job1, Job2, and Job3 from the PC 110 and these print jobs have been held in the print queue 143. In step S601, the printer 140 receives a print job from the PC 110 or 120 via the network 130. In the embodiment, assume that the printer 140 receives the print job Job4 from the PC 120.

In step S602, the CPU 146 analyzes the print job received in step S601, and refers to a paper type designated by, for example, the printer driver of the PC 110 or 120. In the embodiment, assume that the paper type designated by the print job Job4 is "thick coated paper". In step S603, the CPU 146 refers to the type of paper fed in the paper feed unit 144. In the embodiment, assume that "photo semi-glossy paper" is fed in the paper feed unit 144.

In step S604, the CPU 146 determines whether the paper type of the print job that has been referred to in step S602 matches the fed paper type referred to in step S603. If the CPU 146 determines that these paper types match each other, the process advances to step S606; if NO, to step S605. In step S606, the CPU 146 stores the received print job in the print queue 143 to wait for print processing. In the embodiment, the paper type of the print job is "coated paper (thick)" and the type of paper fed in the paper feed unit 144 is "semi-glossy paper", so the CPU 146 determines that these paper types do not match each other, and the process advances to step S605.

In step S605, the CPU 146 stores the received print job in the print queue 143 as a held job. In the embodiment, the CPU 146 stores the print job Job4 in the print queue 143 as a held job. As a result, the state of the print queue 143 after storing the print job changes to one shown in FIG. 4.

Figure 7:
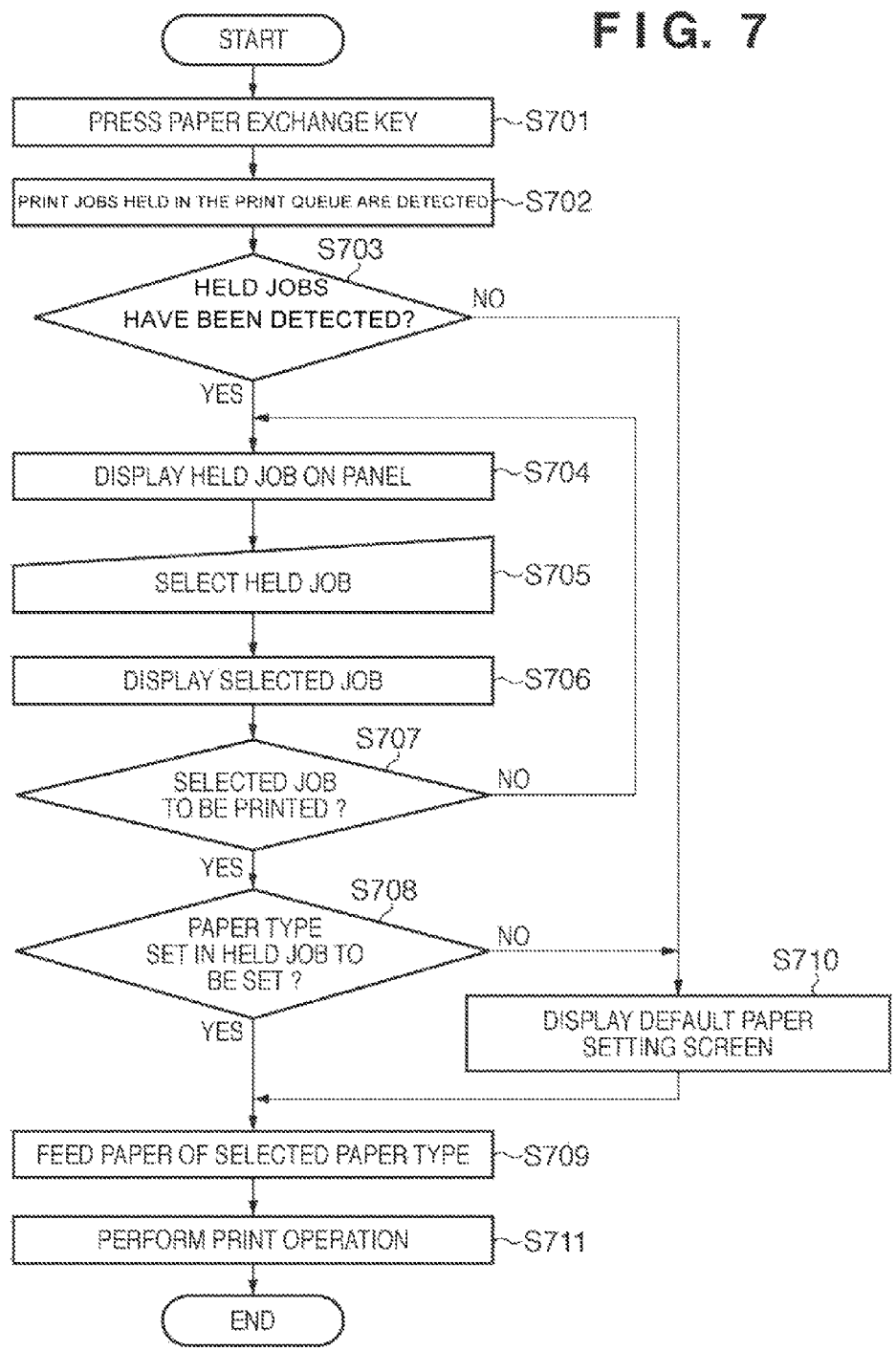
FIG. 7 is a flowchart showing the sequence of processing performed when the user presses a paper exchange button.

FIG. 7 is a flowchart showing the sequence of processing performed when the user presses the operation key 204 (paper exchange button). The embodiment will describe an operation when the user presses the operation key 204 (paper exchange button) while the print queue 143 is in the state shown in FIG. 4, that is, held jobs exist.

In step S701, the user presses the operation key 204 (paper exchange button). In step S702, print jobs (held jobs) held in the print queue 143 are detected. In the embodiment, the print jobs Job1, Job2, Job3, and Job4 shown in FIG. 4 are detected from the print queue 143. In step S703, it is determined whether held jobs have been detected in step S702. If YES in step S703, the process advances to step S704; if NO, to step S710. In step S710, only print jobs in a normal print standby state exist in the print queue 143. That is, paper types designated by these print jobs match one set in the printer 140. To exchange paper, the normal paper exchange screen shown in FIG. 3A is displayed, and the process ends.

In step S704, information of jobs held in the print queue 143 is referred to and displayed on the panel 201, like the screen 502 in FIG. 5 (example of the first display). In step S705, the user selects a held job to be printed from the held jobs displayed on the screen 502 (example of the first selection). For example, the held job Job4 selected in step S706 is displayed on the panel 201, like the screen 503 together with the information of the held job Job4. In step S707, it is determined whether to print the selected held job. At this time, it is determined whether to print the held job, based on which of the operation key 202 (OK button) and the operation key 203 (cancel button) has been pressed by the user. If the user has pressed the operation key 203 to cancel the held job, the process returns to step S704. If the user has pressed the operation key 202 (OK button), the process advances to step S708. In step S708, the screen 504 is displayed (example of the second display). In the screen 504, a paper type designated by the held job Job4, that is, coated paper is displayed at the top. Thus, the user need not scroll the screen using the operation key 205, improving operability. In step S708, it is determined whether to print using a paper type set in the held job Job4. This determination is made based on which of the operation key 202 (OK button) and the operation key 203 (cancel button) has been pressed by the user (example of the second selection). If the user has pressed the operation key 202 (OK button), the process advances to step S709; if he has pressed the operation key 203 (cancel button), to step S710 to display the normal paper exchange screen shown in FIG. 3A. The process then ends.

In step S709, the screen 505 is displayed, and if the user sets paper in the printer, paper of the selected paper type is fed. In step S711, print processing is done for the fed paper.

The above description is premised on that a print job is held when paper types do not match each other. However, a print job may be held when, for example, paper sizes do not match each other. In this case, if the user presses the operation key 204 indicating exchange of paper, a paper size set in the held job is displayed at the top of the screen 504. The user can therefore easily set the type of paper for use when executing printing of a held job. Instead of displaying paper for use at the top, the paper type may be simply automatically scrolled in the display area. Alternatively, the paper type may change to the selected state, or only the paper type may be displayed.

The above description has exemplified display on the screen of the panel 201 of the printer, but the PC may execute similar processing. In this case, the PC acquires, from the printer, information of a held job and information of paper currently set in the printer, and performs the same processing as that described above in accordance with the pieces of information.

<Other Embodiments>

Aspects of the present invention can also be realized by a computer or a plurality of computers of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-002374, filed Jan. 7, 2010, which is hereby incorporated by reference herein in its entirety.

What is claimed is:

1. An apparatus comprising:
a specifying unit constructed to specify a print job to perform a printing process among one or more print jobs held by a holding unit; and
a display control unit constructed to cause a display unit to display printing medium types suppliable to a printing apparatus in a case where the specifying unit specifies the print job;
wherein the display control unit causes the display unit to display the printing medium types suppliable to the printing apparatus such that a printing medium type which is set in the print job specified by the specifying unit and other printing medium types which are not set in the print job specified by the specifying unit are concurrently displayed and the printing medium type which is set in the print job specified by the specifying unit is preferentially displayed compared to the other printing medium types.

2. The apparatus according to claim 1, wherein the one or more print jobs have been held by the holding unit owing to a mismatch between a printing medium type set in a print job and a printing medium type set in the printing apparatus.

3. The apparatus according to claim 1, wherein the display control unit causes the display unit to display, at a top of a list of printing medium types displayed on the display unit, the printing medium type which is set in the print job specified by the specifying unit.

4. The apparatus according to claim 1, wherein the display control unit is further constructed to cause the display unit to display the one or more print jobs held by the holding unit such that the print job can be selected on the display unit to perform the printing process; and
wherein the specifying unit specifies the selected print job.

5. The apparatus according to claim 1, further comprising:
a selection unit constructed to select a printing medium type to be used in the print job specified by the specifying unit, from the printing medium types which are suppliable to the printing apparatus and are displayed on the display unit; and
a printing unit constructed to perform the printing process for the printing medium type selected by the selection unit for the print job specified by the specifying unit.

6. The apparatus according to claim 1, wherein the display control unit causes the display unit to display, by scrolling an area for displaying a list of printing medium types without a user operation, the printing medium type which is set in the print job specified by the specifying unit in the area.

7. The apparatus according to claim 1, wherein the display control unit causes the display unit to display the printing medium type which is set in the print job specified by the specifying unit in a selectable state.

8. The apparatus according to claim 1, wherein the specifying unit specifies the print job among the one or more print jobs held by the holding unit in a case where an instruction for exchanging a printing medium in the printing apparatus is input by an input unit.

9. The apparatus according to claim 1, wherein the apparatus comprises the display unit.

10. The apparatus according to claim 1, wherein the display control unit causes the display unit to display, after a printing medium type is selected from the printing medium types which are suppliable to the printing apparatus and are displayed on the display unit, a screen for prompting a user to exchange a printing medium set in the printing apparatus for a new printing medium.

11. The apparatus according to claim 1, wherein the display control unit causes the display unit to display, after a printing medium type is selected from the printing medium types which are suppliable to the printing apparatus and are displayed on the display unit and execution of printing is instructed, a screen for prompting a user to exchange a printing medium set in the printing apparatus for a new printing medium.

12. The apparatus according to claim 1, wherein the display control unit causes the display unit to display the other printing medium types in an order, wherein the order indicates an order in which print jobs corresponding to the other printing medium types have been held by the holding unit.

13. A method, comprising:
specifying a print job to perform a printing process among one or more print jobs held by a holding unit; and
displaying printing medium types suppliable to a printing apparatus in a case where the print job is specified;
wherein to display the printing medium types suppliable to the printing apparatus such that a printing medium type which is set in the specified print job and other printing medium types which are not set in the specified print job are concurrently displayed and the printing medium type which is set in the specified print job is preferentially displayed compared to the other printing medium types.

14. The method according to claim 13, wherein the one or more print jobs have been held by the holding unit owing to a mismatch between a printing medium type set in a print job and a printing medium type set in the printing apparatus.

15. The method according to claim 13, further comprising displaying, at a top of a list of displayed printing medium types, the printing medium type which is set in the specified print job.

16. The method according to claim 13, further comprising:
displaying the one or more print jobs held by the holding unit such that the print job can be selected to perform the printing process; and
wherein the selected print job is specified.

17. The method according to claim 13, further comprising:
selecting a printing medium type to be used in the specified print job, from the displayed printing medium types which are suppliable to the printing apparatus; and
performing the printing process for the selected printing medium type for the specified print job.

18. The method according to claim 13, further comprising displaying, after a printing medium is selected from the printing medium types which are suppliable to the printing apparatus and are displayed, a screen for prompting a user to exchange a printing medium set in the printing apparatus for a new printing medium.

19. The method according to claim 13, further comprising displaying, after a printing medium is selected from the printing medium types which are suppliable to the printing apparatus and are displayed and execution of printing is instructed, a screen for prompting a user to exchange a printing medium set in the printing apparatus for a new printing medium.

20. A non-transitory computer-readable storage medium storing a program for causing a computer to
specify a print job to perform a printing process among one or more print jobs held by a holding unit, and
display printing medium types suppliable to a printing apparatus in a case where the print job is specified;
wherein to display the printing medium types suppliable to the printing apparatus such that a printing medium type which is set in the specified print job and other printing medium types which are not set in the specified print job are concurrently displayed and the printing medium type which is set in the specified print job is preferentially displayed compared to the other printing medium types.

* * * * *